(12) United States Patent
Rossini

(10) Patent No.: US 10,405,633 B2
(45) Date of Patent: Sep. 10, 2019

(54) COSMETIC REPURPOSING SYSTEM

(71) Applicant: Jill Rossini, Denver, CO (US)

(72) Inventor: Jill Rossini, Denver, CO (US)

( * ) Notice: Subject to any disclaimer, the term of this patent is extended or adjusted under 35 U.S.C. 154(b) by 268 days.

(21) Appl. No.: 15/291,995

(22) Filed: Oct. 12, 2016

(65) Prior Publication Data

US 2017/0127792 A1     May 11, 2017

Related U.S. Application Data

(60) Provisional application No. 62/240,606, filed on Oct. 13, 2015.

(51) Int. Cl.
| | |
|---|---|
| *A45D 33/00* | (2006.01) |
| *B29C 43/36* | (2006.01) |
| *B29K 105/00* | (2006.01) |
| *B29K 105/26* | (2006.01) |
| *B29L 31/00* | (2006.01) |

(52) U.S. Cl.
CPC .............. *A45D 33/00* (2013.01); *B29C 43/36* (2013.01); *B29K 2105/251* (2013.01); *B29K 2105/26* (2013.01); *B29L 2031/718* (2013.01)

(58) Field of Classification Search
CPC ......... A45D 33/00; A45D 33/20; B29C 43/36
See application file for complete search history.

(56) References Cited

U.S. PATENT DOCUMENTS

| | | | | |
|---|---|---|---|---|
| 2,209,781 A * | 7/1940 | Lewis | ..................... | A45C 13/02 |
| | | | | 190/109 |
| 3,300,387 A | 1/1967 | Kole | | |
| 4,337,859 A * | 7/1982 | Murphy | .................. | A45D 33/00 |
| | | | | 132/294 |
| 5,180,240 A * | 1/1993 | Gueret | .................... | A45D 33/00 |
| | | | | 401/200 |
| 5,520,202 A * | 5/1996 | Arbree | ................. | A45C 11/008 |
| | | | | 132/148 |
| 5,845,658 A * | 12/1998 | Sussman | .............. | A45D 33/006 |
| | | | | 132/287 |
| 6,358,448 B1 * | 3/2002 | Green | .................. | A45D 33/006 |
| | | | | 264/109 |

(Continued)

FOREIGN PATENT DOCUMENTS

| | | |
|---|---|---|
| GB | 1001690 A | 8/1965 |
| JP | 07-10721 A | 1/1995 |

(Continued)

OTHER PUBLICATIONS

TBKtrading—https://www.youtube.com/watch?v=ucGW-WmsFNUI (Year: 2011).*

(Continued)

*Primary Examiner* — Robert C Dye
*Assistant Examiner* — Nicholas R Krasnow
(74) *Attorney, Agent, or Firm* — Rocky Mountain Patent LLC

(57) ABSTRACT

A cosmetic repurposing system and associated apparatuses to enable the extraction and reuse of cosmetic materials that otherwise would be wasted. The compact and portable nature of the cosmetic repurposing system allows for ease of use. Further, the standardization of sizes enable the specific application of the system for use within a variety of compacts, makeup kits and in association with a variety of other cosmetic containment vessels.

7 Claims, 13 Drawing Sheets

(56) References Cited

U.S. PATENT DOCUMENTS

| | | | |
|---|---|---|---|
| 8,235,059 B2 | 8/2012 | Pires et al. | |
| 2004/0129599 A1* | 7/2004 | Yi-Hung | A45D 33/008 206/581 |
| 2012/0144590 A1 | 6/2012 | Yamaguchi et al. | |
| 2013/0234351 A1* | 9/2013 | Johnson | A61K 8/34 264/36.1 |

FOREIGN PATENT DOCUMENTS

| | | |
|---|---|---|
| JP | 25-399043 B2 | 1/2014 |
| KR | 2014/069879 A1 | 5/2014 |

OTHER PUBLICATIONS

Michelle Pphan; How to Fix Broken Makeup; https://www.youtube.com/watch?v=1wWhk6q3Blo; Jun. 21, 2013.

LiveloveGlam; How to: Fix a Broken Powder, Blush or Eyeshadow; https://www.youtube.com/watch?v=_xLXX1A7CTw; Nov. 30, 2012.

Taliajoy18; How to Fix Broken Eye Shadow or Blush; https://www.youtube.com/watch?v=YEcQs6TmYD8; Aug. 26, 2011.

LittleMakeupDiva; Easy way to fix/repair broken makeup from a compact; https://www.youtube.com/watch?v=alyjM67c8Kg; Mar. 28, 2009.

Howcast; How to Fix Broken Makeup; https://www.youtube.com/watch?v=k6mHVmuBiml; Jul. 20, 2010.

Zabrena; How to Press Pigments & Fix Broken Eyeshadows; https://www.youtube.com/watch?v=NnoKtmmc3wY; Jan. 9, 2013.

KlairedelysArt; How to: Mend Broken Eyeshadow; https://www.youtube.com/watch?v=I15xHtAuFi0; Aug. 6, 2009.

How to make your own makeup: Eyeshadow; https://www.youtube.com/watch?v=9SzEJFtOT64; Apr. 4, 2010.

Chocolatemilk0104; Pressing tkb trading mineral pigments with alcohol and glycerine; https://www.youtube.com/watch?v=I8Nhzpgqrbk&feature=em-subs_digest-vrecs; Nov. 15, 2009.

Danielle (Lepooke); How to Press Loose Eyeshadows/Pigments; https://www.youtube.com/watch?v=J2S4iTke0rc; Mar. 24, 2011.

Beautynewbie; Everything You Need to Know About Pressing Pigments and Minerals; https://www.youtube.com/watch?v=I3m5wgvzZUg; Aug. 30, 2010.

Soap Queen TV; How to make Mineral Makeup Eyeshadow; https://www.youtube.com/watch?v=vfEeHfYViMI; Aug. 18, 2011.

Ohceanique; How to make your own eyeshadow; https://www.youtube.com/watch?v=Ep0_gGBgsdk; Dec. 2, 2011.

Emma Matthews; How to Fix Broken Makeup With a Simple Drugstore Hack—Tutorial; Blog post; https://www.bustle.com/articles/159852-how-to-fix-broken-makeup-with-a-simple-drugstore-hack-tutorial; May 10, 2016.

DIY Cosmetics LLC; Collections; https://www.diycosmetics.com/collections.

DIY Pak; https://diypak.com/.

Magalie; 15 little known things that all girls should know about eye shadows; Blog post; http://www.astucesdefilles.com/2016/03/20/15-choses-meconnues-que-toutes-les-filles-doivent-connaitre-sur-les-fards-a-paupieres/; Mar. 20, 2016.

\* cited by examiner

COSMETIC REPURPOSING SYSTEM

CROSS-REFERENCE TO RELATED APPLICATIONS

This application claims priority to U.S. Provisional Patent Application 62/240,606 filed Oct. 13, 2015.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Cosmetic or makeup application systems exist in many forms. Individuals often utilize a variety of apparatuses and systems, including mirrors, compacts, blush kits and other makeup containment and application apparatuses in conjunction with the application of makeup to the body.

Many such application apparatuses and systems, however, waste otherwise usable makeup because of the shape or methods of uses of such apparatuses and systems. Makeup containment systems often cause cosmetic materials to break up into unusable pieces. For instance, when dropped, a makeup containment mechanism may not adequately protect cosmetic materials contents. The shock of impact associated with a drop may dislodge or cause the disintegration of the contents of cosmetic material containers. Therefore, a previously unsolved problem is need for efficiently repurposing cosmetic materials after such cosmetic materials have become dislodged, disintegrated, or broken.

Another example of cosmetic material waste derives from the design of cosmetic materials containment mechanisms. For instance, many compacts utilize a circular dish to contain makeup, which interacts with an application mechanism that extracts makeup from the center of the dish first. As a result, over time, makeup is extracted from the center of the dish first, leaving ridges of makeup on the sides of the dish. Relatedly, previously known designs of cosmetic materials containment mechanisms require the user to blend colors on skin before being able to test new colors. Such cosmetic material containment mechanisms also create difficulty for a user to blend multiple colored loose powders. Such cosmetic material containment mechanisms also create a mess during the process of applying cosmetic materials. A present need therefore exists for superior methods and apparatuses to blend, store and apply cosmetic materials.

In association with known cosmetic application devices, the shape of the specific cosmetic application mechanism in relation to the ridges that form up on the sides of the dish diminish the ability for the makeup to be extracted from the dish for application on to the body. As a result, a significant portion of makeup material is left over, generally to be thrown away. Therefore, prior to the disclosures herein, an unmet need has existed for a solution for repurposing left-over makeup materials.

Other cosmetic repurposing devices purport to repurpose left-over makeup. One such mechanism involves an ad-hoc method that utilizes a coin to press makeup into place. However, this and other such do-it-yourself solutions require a learning curve and experimentation, and also require the use of a variety of other components not specifically intended for the repurposing of makeup. Thus, the resulting repurposed and recaptured left-over makeup remains available generally for placement into either their original containment mechanisms or into ad-hoc, non-standardized containment forms, diminishing opportunities for compatibility with other existing makeup containment mechanisms. As a result, portability and usability of the repurposed makeup is diminished.

The present inventor has recognized that the application of some standard form screen filters to a cosmetic repurposing kit may limit the flow of cosmetic material. Screens designed for other uses may impede the flow of the presently contemplated flow of cosmetic material passing through, making use of a general use screen as known in the prior art and untailored to the repurposing of cosmetic material unwieldly and inefficient.

Pressing mechanisms associated with pressing cosmetic material often lack capability to prevent adherence of such cosmetic material to the pressing mechanism following use. As a result, cosmetic material can be wasted. Moreover, the additional time spent by a user either preparing or cleaning the pressing mechanism, or re-engaging the press to capture otherwise wasted cosmetic material, makes use of cosmetic repurposing devices incorporating such presses unwieldly or inefficient. Further, presses that exhibit problems associated with adherence of cosmetic material leave pressed makeup with undesirable ornamental qualities. One general problem associated with cosmetics is the general lack of standardized sizing of containment mechanisms. This complicates efforts to collect and repurpose makeup left over from old makeup containers. For instance, the sizing for a containment mechanism appropriate for eye shadow differs from the sizing for containment mechanisms for either blush or pressed powder cosmetics. This lack of standardization often creates challenges associated with repurposing left over cosmetic remnants.

SUMMARY

A variety of apparatuses are presented herein that, when combined into a self-enclosed form in the preferred embodiment, enable a user to extract and repurpose cosmetic material 12 that otherwise would go wasted. The preferred embodiment of the system incorporates a makeup pressing tool 2, a cosmetic manipulation tool 3, a solution containment vessel 4, one or more makeup containment vessels 5, a press top 6, a press base 7, a bottom tray 8, a screen 9, a drawer 11, and a combined enclosure for the preceding elements placed together within one unified form 1. Various embodiments of the invention may encompass a subset or superset of the above listed elements. The parts interact with each other in such a way to enable the efficient packaging of such elements so that a user may follow a step-by-step, replicable method to extract and repurpose cosmetic material.

DETAILED DESCRIPTION

Figure 1:
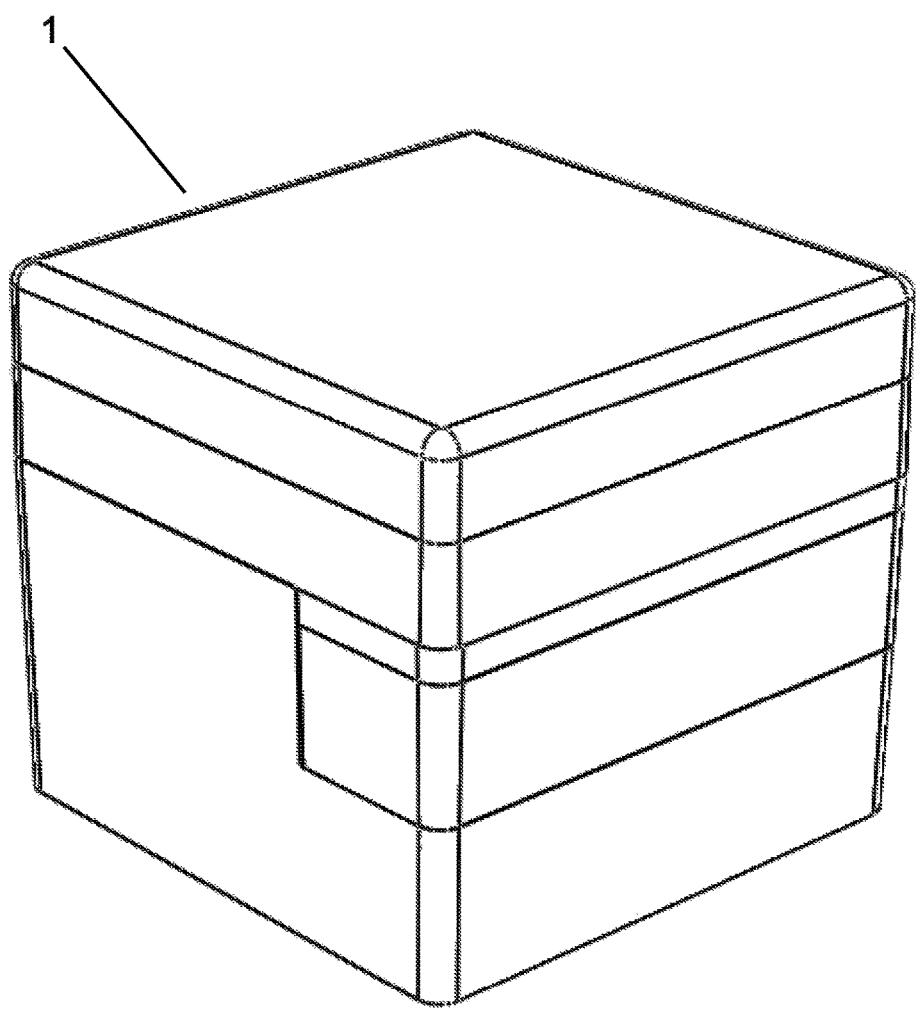
FIG. 1: An embodiment of the self-enclosed cosmetic repurposing system in compact form view of a unified enclosure as one unified form 1.
Figure 2:
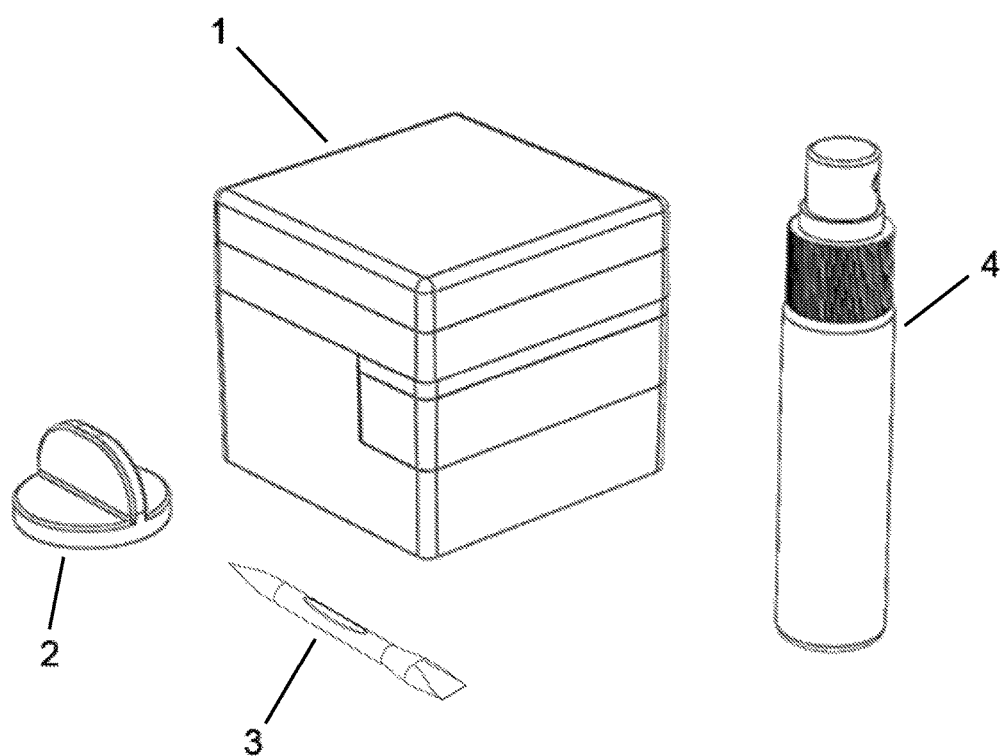
FIG. 2: An embodiment of the cosmetic repurposing system featuring a makeup pressing tool 2, a cosmetic manipulation tool 3, and a solution containment vessel 4, shown outside the unified form 1 for exemplary purposes.
Figure 3:
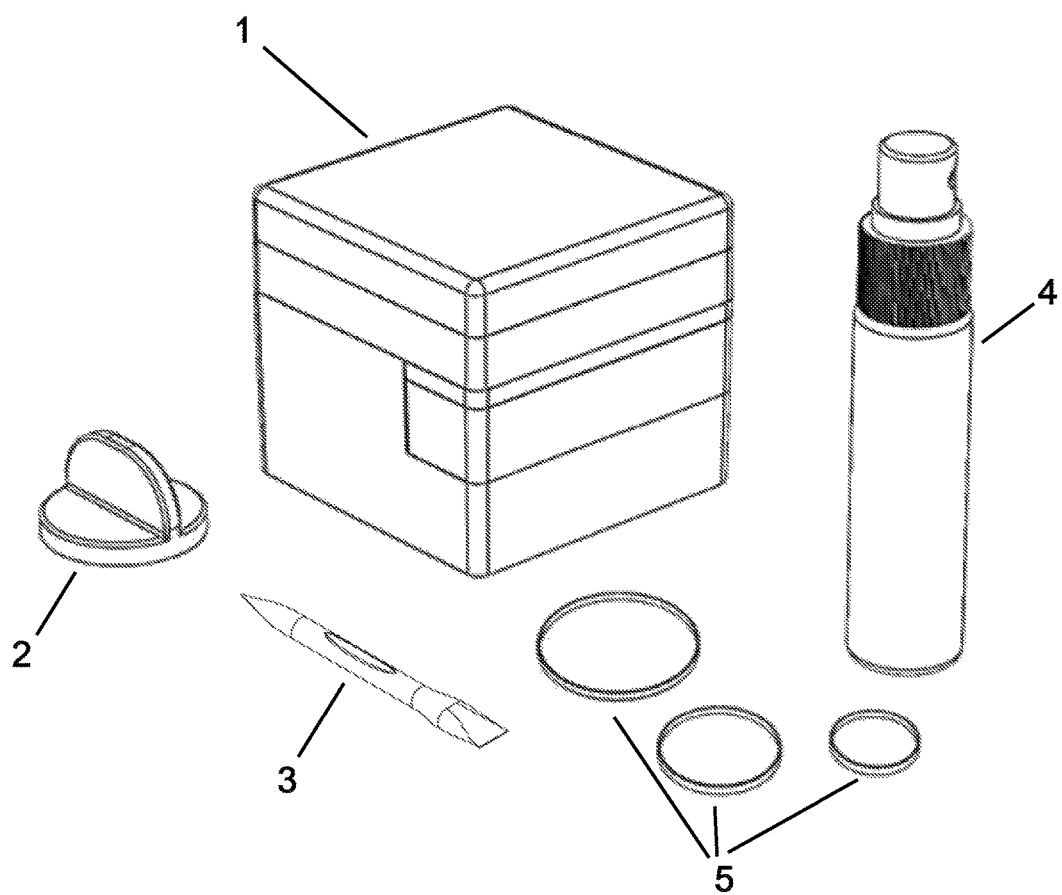
FIG. 3: An embodiment of the cosmetic repurposing system featuring a makeup pressing tool 2, cosmetic manipulation tool 3, solution containment vessel 4, and makeup containment vessels 5, shown outside the unified form 1 for exemplary purposes.
Figure 4:
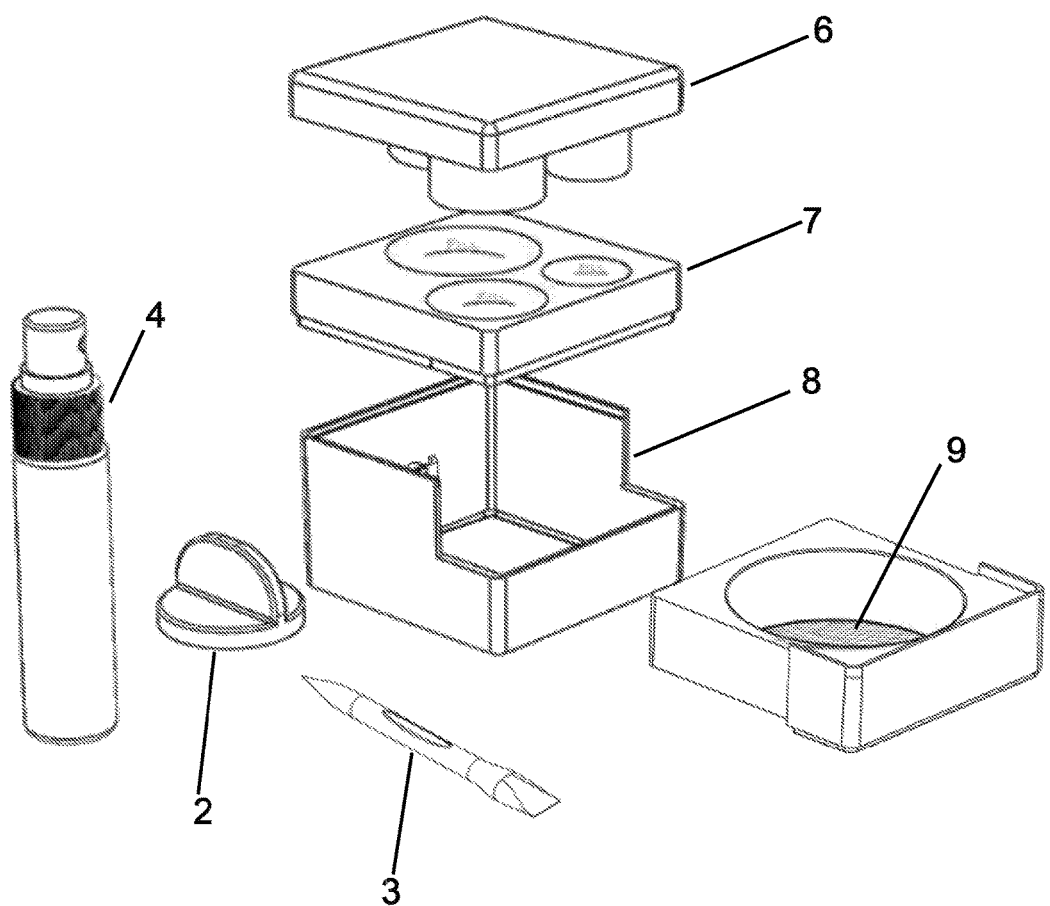
FIG. 4: An embodiment of the self-enclosed cosmetic repurposing system shown in exploded view.
Figure 5:
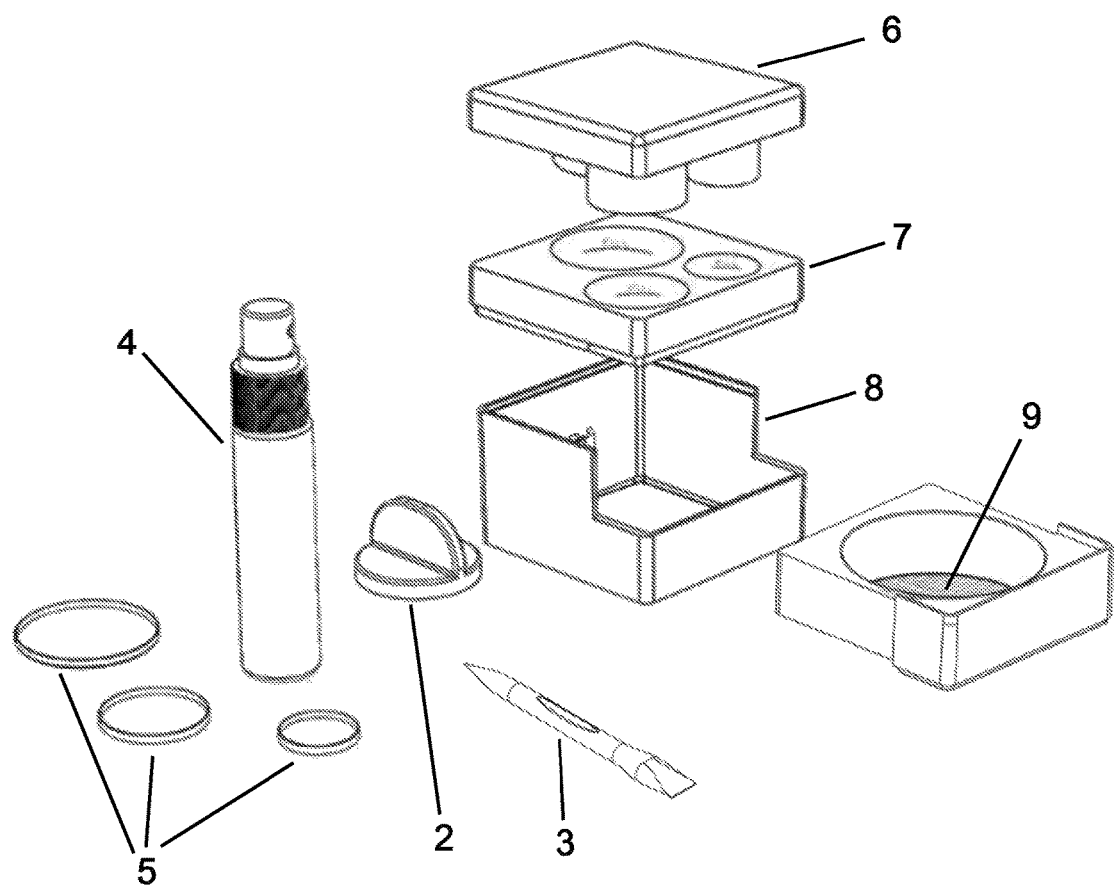
FIG. 5: An embodiment of the self-enclosed cosmetic repurposing system shown in exploded view, additionally showing makeup containment vessels 5.

The following disclosure presents and describes a system for repurposing cosmetic material 11 and related components. The inventor has recognized a variety of advantages associated with the disclosure herein, including the portable and durable nature of the elements described herein.

The preferred embodiment of the invention incorporates vessels to contain cosmetic materials. The inventor has recognized an advantage of the preferred embodiment of the present invention in that the makeup containment vessels 5 exist in standardized sizes. The nature of the invention allows the user to select a particularly sized makeup containment vessel appropriate to the type of cosmetic material that the user would like to repurpose. It has been left to the present inventor to develop a solution in the preferred embodiment to standardize the sizes for containment of cosmetic materials with makeup containment vessels comprising three standard sized makeup tins within a system comprising cosmetic repurposing kit.

The preferred embodiment of the present invention addresses the need for standardization of containment mechanism sizes within a unified kit by designating separate sized containment mechanisms to contain any of a variety of types of cosmetic material such as eye shadow cosmetic material, blush or bronzer cosmetic material, and/or pressed powder cosmetic material. Each makeup containment vessel in the preferred embodiment is standardized to fit within the dimensions of the cosmetic repurposing system in the preferred embodiment of the invention. The makeup containment vessel take the forms of makeup tins in preferred embodiments of the invention.

While the material used for the makeup containment vessels 5 may comprise tinplate, one skilled in the art recognizes that a variety of materials including aluminum, aluminum foil, plastic, other formed metals or alloys could replace tin in varying embodiments.

The smallest makeup containment vessel in the preferred embodiment of the invention provides containment for eye shadow cosmetic material. The present inventor has recognized that cosmetic material related to eye shadow is most appropriately contained in a containment mechanism smaller than mechanisms containing, for example, blush, bronzer or pressed powder cosmetic materials. In the preferred embodiment of the invention, the smallest makeup containment vessel is circular in nature with raised sides along the circumference. In the preferred embodiment of the invention, the diameter of the smallest containment mechanism is approximately 1.05 inches and the height of the smallest containment mechanism is approximately 0.15 inches.

The medium-sized makeup containment vessel, larger than the makeup containment vessel generally intended for eye shadow cosmetic material, provides containment for blush cosmetic material or bronzer cosmetic material in the preferred embodiment. In the preferred embodiment of the invention, the medium-sized makeup containment vessel is circular in nature with raised sides along the circumference. In the preferred embodiment of the invention, the diameter of the medium-sized makeup containment vessel is approximately 1.44 inches and the height of the medium-sized containment mechanism is approximately 0.135 inches.

The largest makeup containment vessel, larger than the containment vessel generally intended for blush or bronzer cosmetic material, provides containment for pressed powder in the preferred embodiment. The present inventor has recognized that the application of pressed powder involves the use of a pad applicator. As pad applicators known in the art often match or exceed a diameter of 67 mm, the size of one historically oft-used size pad applicator, the larger diameter of the makeup containment vessel generally intended for pressed powder accomodates the efficient application of makeup with pads of this size. In the preferred embodiment of the invention, the largest makeup containment vessel is circular in nature with raised sides along the circumference. In the preferred embodiment of the invention, the diameter of the largest makeup containment vessel is approximately 1.875 inches and the height of the smallest containment mechanism is approximately 0.175 inches.

After a user determines the appropriately-sized makeup containment vessel of the above three in the preferred embodiment of the invention based on the type of cosmetic material to be repurposed, the user places the appropriately-sized makeup containment vessel into the correspondingly sized hole into the press base 7. The user may then place the cosmetic material to be repurposed 12 into one of the makeup containment vessels 5 that represents the most-appropriately sized makeup containment vessel.

The preferred embodiment of the invention incorporates a cosmetic manipulation tool 3. The purpose of the cosmetic manipulation tool 3 is to remove the cosmetic material to be repurposed from its original container. In the preferred embodiment, an intended use of the tool is to level the cosmetic material in the containment vessel held within the press base 7, by running the cosmetic manipulation tool over a pile a loose cosmetic material to even the top profile of the cosmetic material to generally the same height of the vertically-oriented sides of the containment vessel so that the top surface of the loose cosmetic material is flush within the containment vessel with a generally flat top surface. In embodiments of the invention, the cosmetic manipulation tool 3 may take the form of a generally flat scraper. In certain embodiments, the cosmetic manipulation tool 3 may incorporate a brush or scraper at the opposite end of a pick tool, or instead only take the form of a pick.

The preferred embodiment of the invention also incorporates a screen 9, a drawer 11, and a makeup pressing tool 2. In the preferred embodiment, the dimensions of the screen 9 exceed the dimensions of a void formed into the drawer 11 such that the screen 9 overlays at least the entirety of the void formed into the drawer. In an embodiment of the invention, the drawer 11 incorporates a ledge, one purpose of which is to facilitate placement of the screen 9 over the drawer in a controlled manner. In the preferred embodiment, a user may place loose cosmetic material onto the screen 9 without much or any loose cosmetic material 12 transferring into the void without filtration through the screen. In an embodiment, an intended purpose of the bottom tray 8 is to catch cosmetic material 12 after it is transferred through the screen 9 fitted within the drawer 11 prior to repurposing. In the preferred method of use, a user utilizes the cosmetic manipulation tool 3 to extract cosmetic material 12 from its original container. The original container is held over the screen 9, so that the cosmetic material 12 to be repurposed from its original container falls over the screen 9.

The preferred embodiment of the invention incorporates a makeup pressing tool 2. In the preferred method of use, the user utilizes the makeup pressing tool 2 to apply force to the cosmetic material 12 to be repurposed as it sits on the screen 9. A user may utilize a pressing and grinding motion with the makeup pressing tool 2 to grind the cosmetic material 12 to be repurposed through the screen 9.

The preferred embodiment of the invention also incorporates a bottom tray 8. In addition to serving as a key structural element in the preferred embodiment of the invention, the bottom tray 8 also functions to collect the cosmetic material 12 to be repurposed after it has been pressed through the screen 9 by the user. In the preferred method of use, the cosmetic material 12 to be repurposed is poured from the bottom tray 8 into one or more makeup containment vessels 5 directly from the bottom tray 8.

An embodiment of the makeup pressing tool 2 incorporates a pattern of ridges on the underside. It has been left for the present inventor to discover that the ridges in such embodiment function to accelerate the flow of cosmetic material 12 into the bottom tray 8.

An embodiment of the invention incorporates a makeup brush within the cosmetic manipulation tool 3 wherein the brush portion protrudes from the distal end opposite the pick portion of the cosmetic manipulation tool 3. In an embodiment of the invention, a user may utilize the brush to assist with the transfer of finely ground cosmetic material 12 to be repurposed from the bottom tray 8 into one or more makeup containment vessels 5.

The preferred embodiment of the invention also incorporates a press base 7. In the preferred method of use, once the cosmetic material 12 to be repurposed has been poured into one or more makeup containment vessels 5, the one or more makeup containment vessels 5 is/are placed into the press base 7. In the preferred embodiment, the press base 7 incorporates three cylindrical voids 10 each specially fitted to securely house three separate sized makeup containment vessels: the smallest containment mechanism, the medium-sized containment mechanism, and the largest containment mechanism. The present inventor has noted that the press base may have a supportive rib to provide structural integrity for the press base in certain embodiments, however in the preferred embodiment the press base lacks such a supportive rib.

Figure 6:
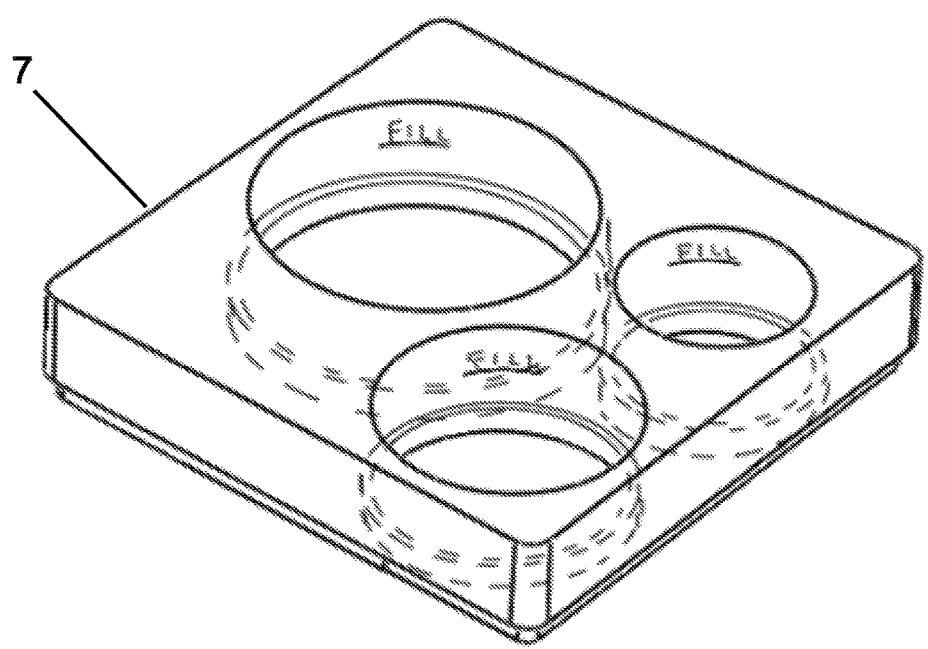
FIG. 6: An embodiment of the press base 7 associated with the preferred embodiment of the cosmetic repurposing system.
Figure 7:
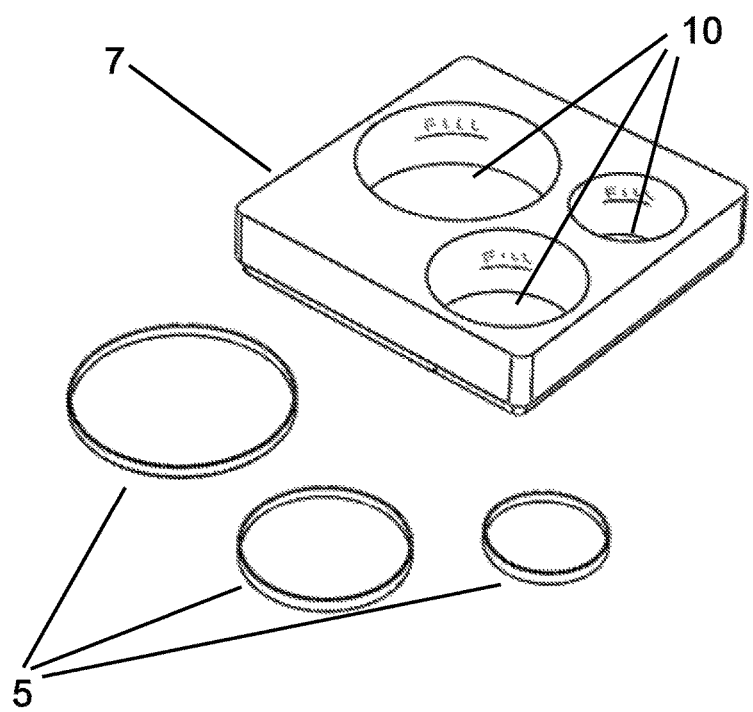
FIG. 7: An embodiment of the press base 7 associated with the preferred embodiment of the cosmetic repurposing system displayed with externally placed makeup containment vessels 5 of sizes corresponding to the cylindrical voids 10 in the press base 7.
Figure 8:
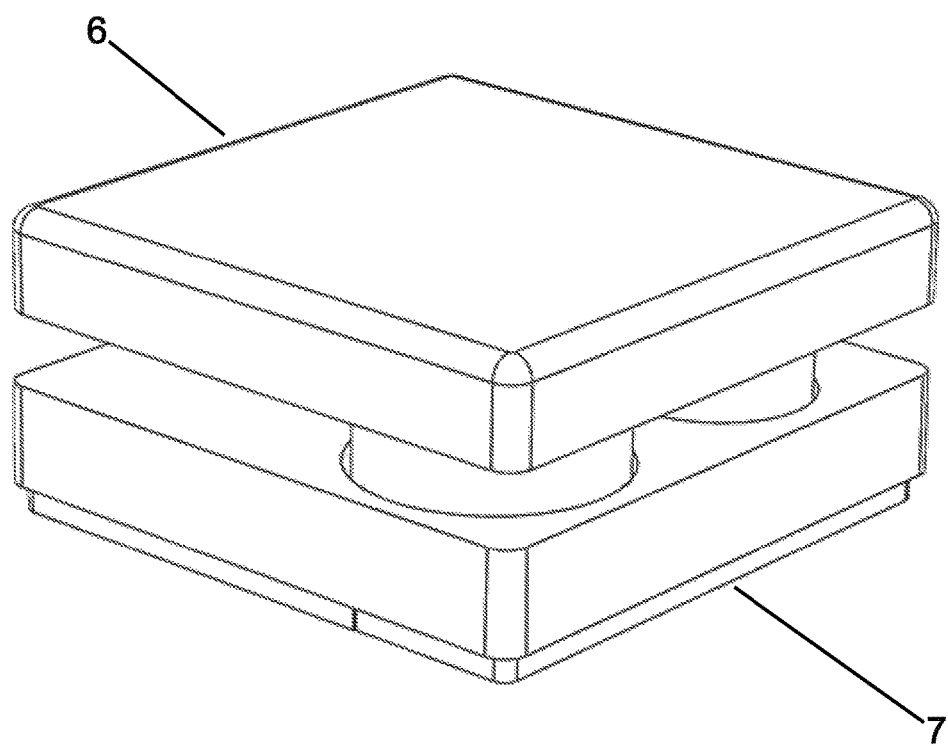
FIG. 8: An embodiment of the press top 6 placed into the press base 7 of the cosmetic repurposing system.
Figure 9:
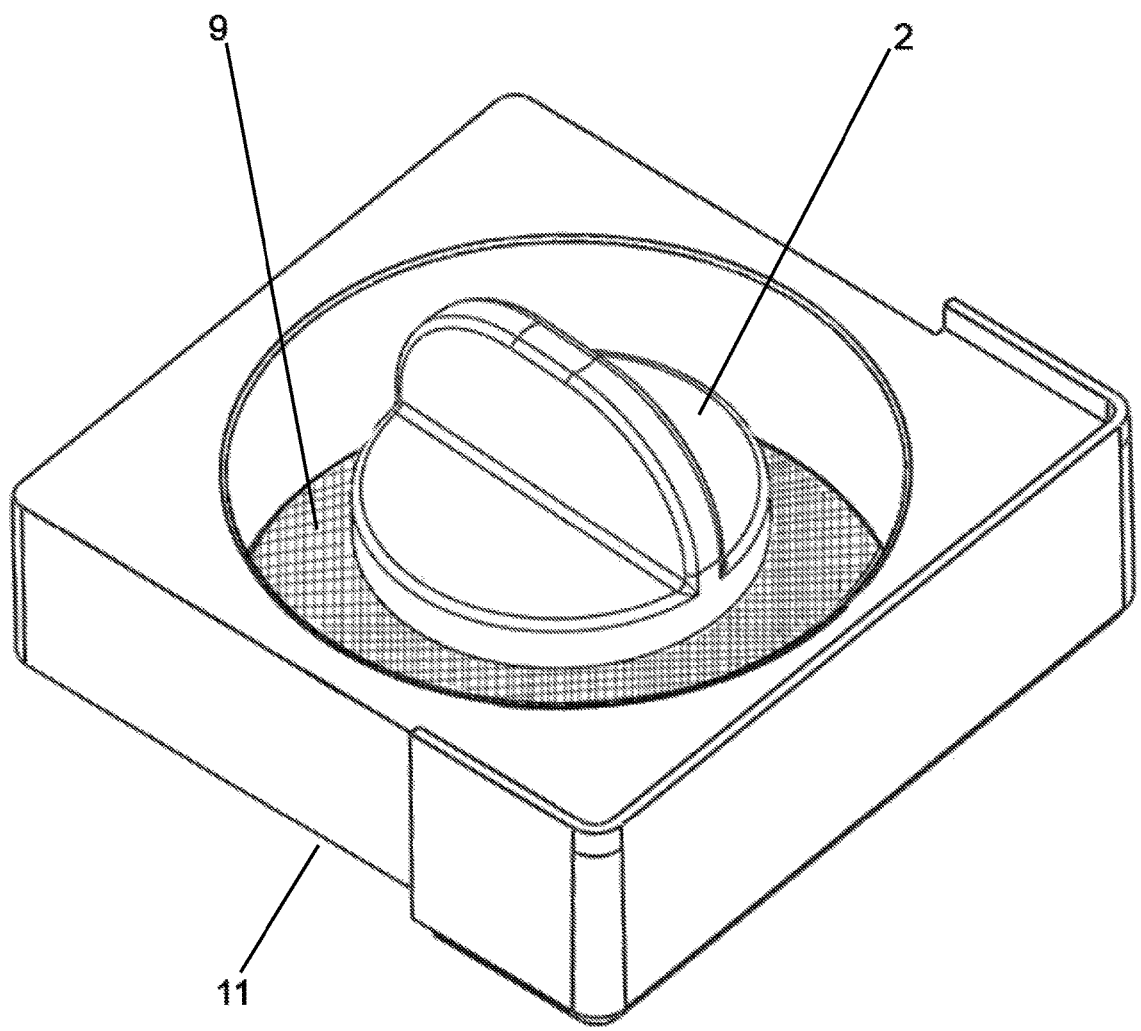
FIG. 9: An embodiment of the makeup pressing tool 2 associated with the preferred embodiment of the cosmetic repurposing system placed above a screen 9 within the drawer 11 associated with the preferred embodiment of the invention.
Figure 10:
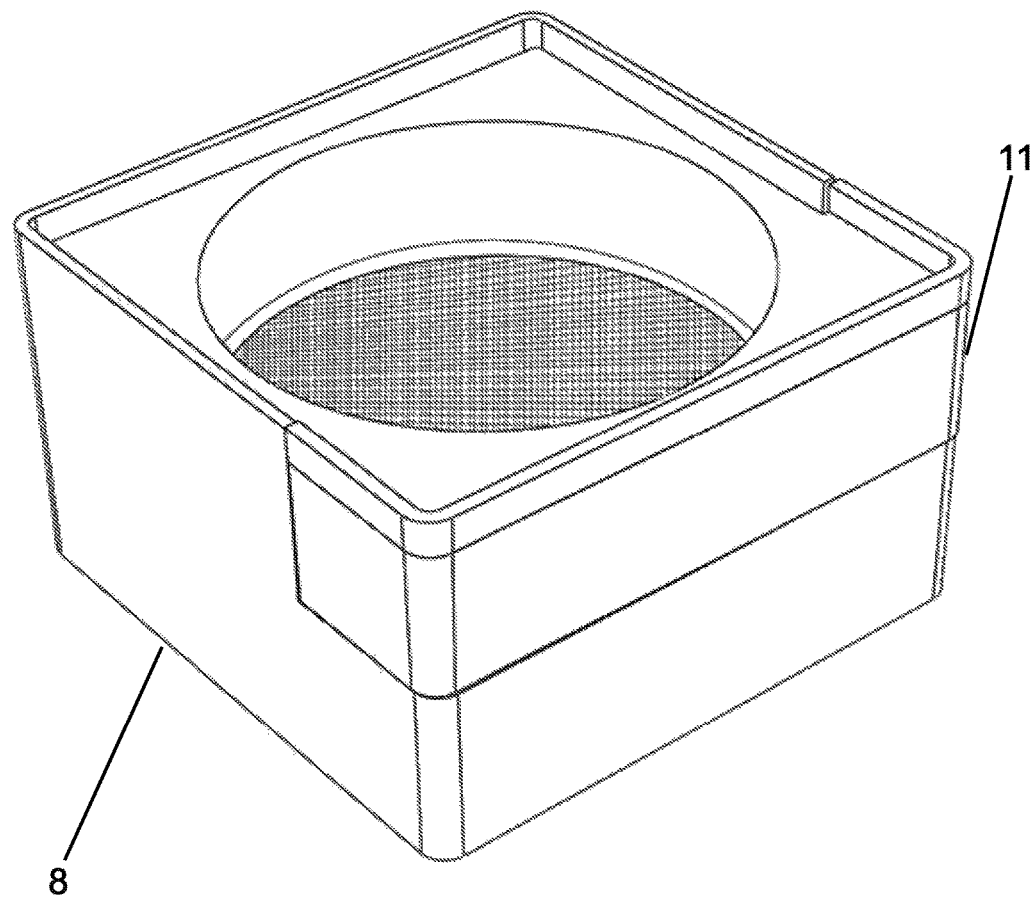
FIG. 10: An embodiment of the bottom tray 8 with the drawer 11 placed above it as intended for use in association with the preferred embodiment of the invention.
Figure 11:
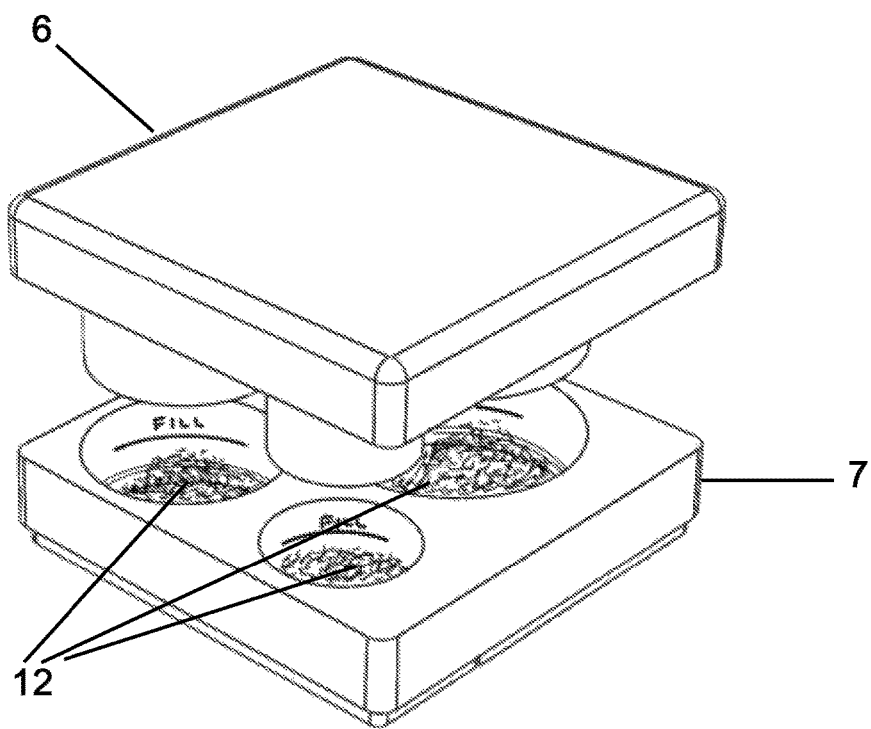
FIG. 11: An embodiment of the press top 6 above cosmetic material 12 to be repurposed by placement within the makeup containment vessels within the press base 7 of the cosmetic repurposing system.

An embodiment of the invention incorporates a maximum fill indicator, as depicted by FIG. 6. The present inventor has determined that loose cosmetic material can approximate two or three times the volume of compressed cosmetic material. In an embodiment of the invention, cosmetic material 12 transforms from loose cosmetic material to compressed cosmetic material after being pressed by a user utilizing the makeup pressing tool 2. The purpose of the maximum fill indicator is to inform the user of the maximum height for the loose makeup placed within the cylindrical voids 10 of the press base 7. In the preferred embodiment incorporating a maximum fill indicator, a line serving as the maximum fill indicator is placed on the sidewall enclosing the cylindrical void 10 incorporated into the press base at a height of approximately two to three times the height of the sidewall of the correspondingly shaped makeup containment vessel as placed within the cylindrical void 10.

The preferred embodiment of the invention incorporates a press top 6. The press top 6 may function as a handheld press that enables a user to apply pressure to cosmetic material 12 to be repurposed. In varying embodiments, the press top 6 also functions as a structural element of the one unified form 1 of the system, more precisely as a lid for the self-enclosed cosmetic repurposing system.

In an embodiment of the press top 6, the press top 6 integrates cups placed upon the cylindrically-shaped protrusions extending from its main body to minimize the adherence of cosmetic material 12 to the press top 6 during use. The inventor has specifically discovered that cups comprising silicone, rubber or a combination thereof function to minimize said adherence of cosmetic material, and therefore are the preferable materials to construct said cups. In an embodiment of the press top 6 designed to incorporate cups, cross section supports are included within the cylindrically-shaped protrusions to bolster the structural integrity of the unit during the intended pressing action. In an embodiment of the invention, the cylindrically-shaped protrusions incorporate round, flat disks to ensure that the cosmetic material compressed with the press top has a flat and smooth profile. This embodiment stems from the inventor's discovery that incorporation of the silicone cups alone often fails press the makeup perfectly flat, and the optional incorporation of the round, flat disks enable the resulting cosmetic material to maintain a flat profile within, for instance, a cosmetic material containment mechanism, if so desired.

In the preferred method of use, the user determines which size of the makeup containment vessels 5 best corresponds to the amount and type of cosmetic material 12 to be repurposed. Once determined, the user then places the appropriately sized makeup containment vessel into the correspondingly sized cylindrical void within the press base 7. The user then places cosmetic material 12 to be repurposed that has been forced through the screen 9 into the bottom tray 8 from said press base 7 into said appropriately sized makeup containment vessel.

An embodiment of the invention may incorporate a containment vessel for solution 4. Depending on the form of cosmetic material 12 to be repurposed, a solution may be applied to the cosmetic material 12 to be repurposed in the preferred method of use. Some forms of cosmetic material to be repurposed, such as mineral makeup or makeup that is already in the form of a loose powder, may not require the use of solution.

In the preferred method of use, when the user determines that solution is appropriate to be applied, the user will apply solution dispensed from the containment vessel for solution 4 to cosmetic material 12 to be repurposed after it is placed within one or more makeup containment vessels 5 after placement of said makeup containment vessels within the press base 7.

Generally, a solution may serve as a base to formulate cosmetics. Alcohol Denat., the general name used for denatured alcohol, functions as the solution in preferred embodiments of the invention. In the United States, Alcohol and Alcohol Denat. are regulated by the Alcohol and Tobacco Tax and Trade Bureau (TTB) of the Department of Treasury. They specify how alcohol is denatured and the types of products in which the specific denatured alcohols are permitted for use.

Specific denatured alcohols as defined by the TTB that are permitted for use in cosmetics and personal care products include Specially Denatured (SD) Alcohol 3-A, SD Alcohol 30, SD Alcohol 39, SD Alcohol 39-B, SD Alcohol 39-C, SD Alcohol 40, SD Alcohol 40-B and SD Alcohol 40-C. Denatonium Benzoate, Quassin, Brucine and Brucine Sulfate are examples of denaturants. In the preferred embodiment of the invention incorporating a solution, SD Alcohol 40 serves as the solution. However, one skilled in the art will appreciate that a variety of variants including and in addition to those listed above may function as the solution anticipated for use in conjunction with various embodiments of the invention.

Regardless of whether solution has been applied, to package repurposed cosmetic material, the user places the press top 6 onto the cosmetic material 12 to be repurposed within one or more makeup containment vessels 5 that has/have been placed within the press base 7, and applies pressure. Varying embodiments of the preferred method of use of the invention may optionally incorporate the step of placing a standard facial tissue over the press base prior to the user's application of pressure with the press top to prevent adhesion of cosmetic material 12 to the press top 6 after being sprayed with solution.

Separately, placement of tissue may reduce the need for cleaning the press top 6. Alternative embodiments include the placement of silicone, Teflon, or other non-stick material on the contact edge of the press top 6 to prevent adhesion of cosmetic material 12 to the press top 6 resulting from the pressing process.

An embodiment of the invention may further incorporate a workspace mat. The workspace mat approximates the dimensions of a standard sized rectangular placemat in the preferred embodiment. In the preferred embodiment, the workspace mat consists of vinyl. In other embodiments, the mat may be formulated out of rubber, plastic, or another similar durable and easy to clean material in varying embodiments.

Figure 12:
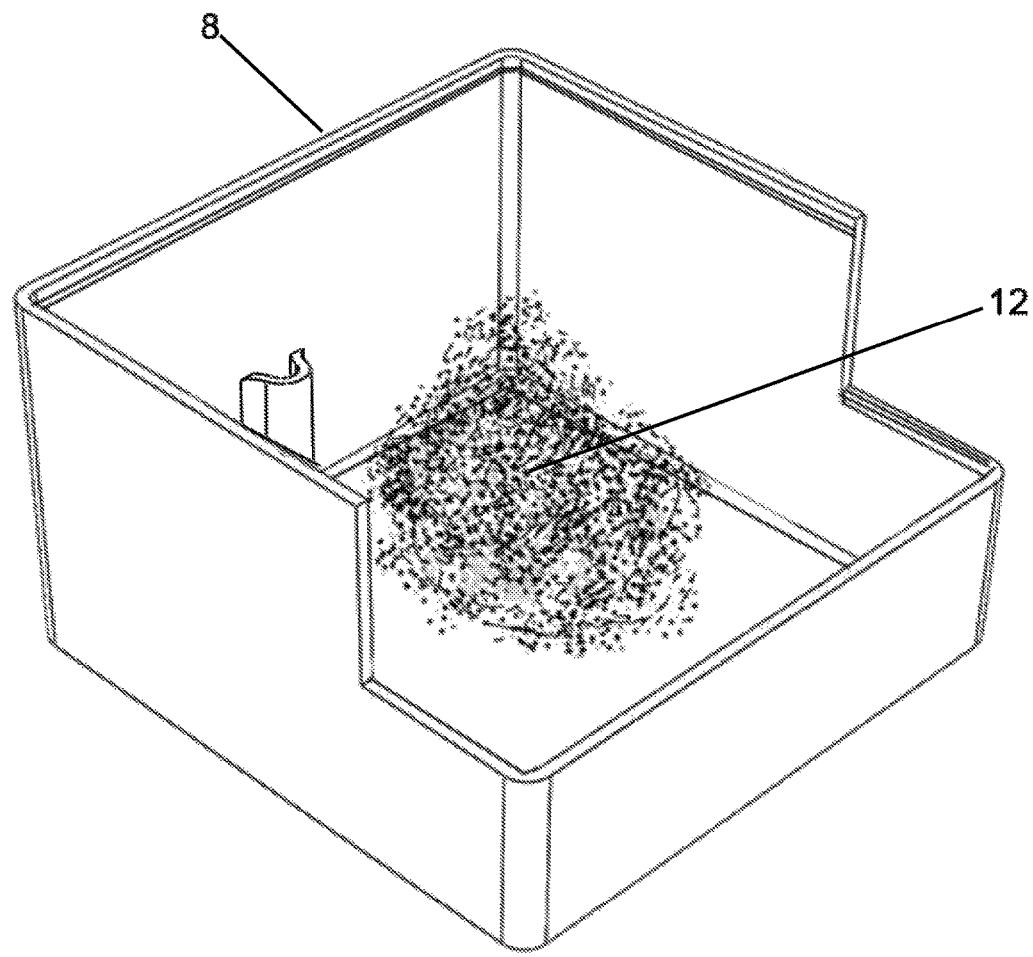
FIG. 12: An embodiment of the bottom tray 8 containing cosmetic material 12.
Figure 13:
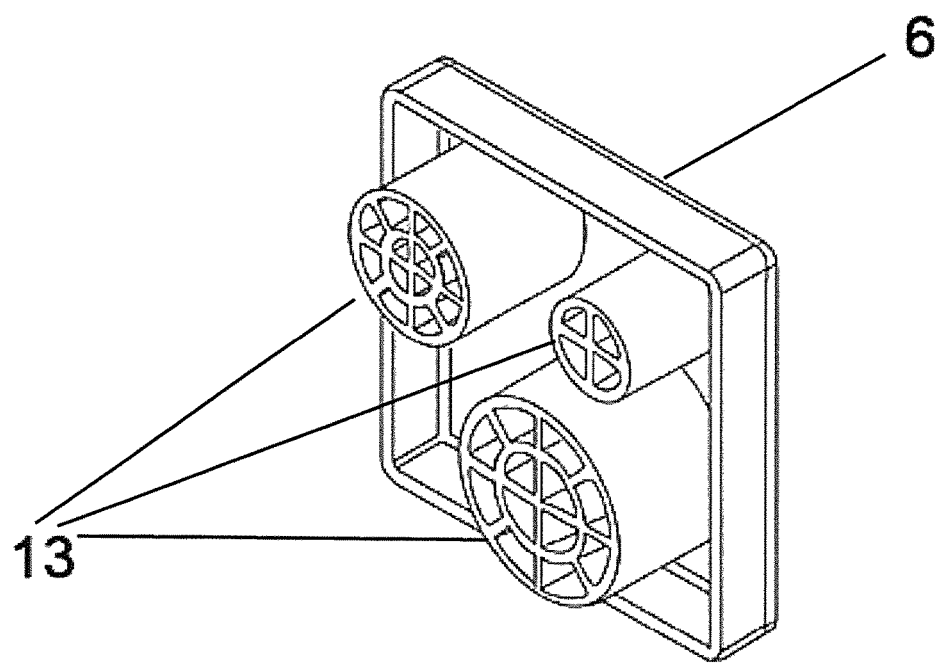
FIG. 13: An embodiment of the press top 6 featuring press supports 13 included within the cylindrically-shaped protrusions of the press top 6 to bolster the structural integrity of the unit during pressing action and to assist with pressing the repurposed cosmetic material.

The present inventor has recognized a preferred method of utilizing the apparatuses described herein to mix various types of cosmetic materials and press cosmetic materials into makeup containment vessels 5. The preferred method of use of the system known to the inventor is described as follows. First, a user of the system chooses the mixture of one or more cosmetic materials 12 the user would like to repurpose. A user may choose the mixture with the intent of general repurposing of cosmetic materials or with the intent to choose the mixture to specifically create a new color, hue and/or shade of cosmetic. Second, a user of the system scoops the chosen mixture of cosmetic materials into the bottom tray 8 as depicted in FIG. 12. Third, a user of the system blends the chosen mixture of cosmetic materials within the bottom tray 8 through use of either the cosmetic manipulation tool 3, or by use of a mixing apparatus not contained within the system such as a common table spoon. Fourth, a user of the system inserts one or more makeup containment vessels 5 into the press base 7 and then places the cosmetic material 12 from the bottom tray 8 into the one or more makeup containment vessels 5. Fifth, if the chosen cosmetic material mixture is non-mineral in nature, a user of the system sprays the non-mineral cosmetic material mixture with solution, or if the cosmetic material is mineral in nature a user moves on to the sixth step. Sixth, a user of the system utilizes the press top 6 to press the cosmetic material 12 into one or more makeup containment vessels 5. Seventh, the user places the one or more makeup containment vessels 5 into an external storage device, such as a magnetic pallet or individual cosmetic case for commonplace usage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

I claim:

1. A system for repurposing cosmetic material designed to combine the cosmetic material into a single body, comprising:
   a press top, comprising a plurality of cylindrically-shaped protrusions,
   the press top further comprising a bottom side of dimensions corresponding to the dimensions of the top side of a press base such that the press top may precisely fit into the press base when the system is combined into a unified form;
   at least one makeup containment vessel,
   the press base containing at least one void corresponding in size to at least one makeup containment vessel;
   a drawer, comprising a void and a screen, the screen configured to overlay at least the entirely of the void of the drawer;
   a bottom tray;
   the bottom tray comprising a void to accommodate the drawer; and
   the drawer configured to match the dimensions of the bottom tray such that the drawer may precisely fit into the void of the bottom tray when the system is combined into a unified form.

2. The system for repurposing cosmetic material of claim 1, further comprising a makeup pressing tool.

3. The system for repurposing cosmetic material of claim 1, further comprising a solution containment vessel.

4. The system for repurposing cosmetic material of claim 1, further comprising a cosmetics manipulation tool.

5. The system for repurposing cosmetic material of claim 4, wherein the cosmetics manipulation tool incorporates a pick distal to a scraper.

6. The system for repurposing cosmetic material of claim 1, further comprising a workspace mat.

7. The system for repurposing cosmetic material of claim 1, said press top further comprising at least one cup.

* * * * *